United States Patent [19]

Sato

[11] 4,022,306
[45] May 10, 1977

[54] ANTI-SKID BRAKE SYSTEM WITH ACCELERATOR CONTROL

[76] Inventor: Yasuo Sato, 11 Kizukuri-cho, Gifu, Japan

[22] Filed: Oct. 28, 1975

[21] Appl. No.: 625,942

[52] U.S. Cl. ............................. 192/3 TR; 188/354; 303/100
[51] Int. Cl.² ..................... B60K 29/02; B60T 7/12
[58] Field of Search ........................ 192/3 TR, 3 R

[56] References Cited

UNITED STATES PATENTS

| | | | |
|---|---|---|---|
| 2,870,885 | 1/1959 | McIntosh et al. | 192/3 TR |
| 2,881,879 | 4/1959 | Perrino | 192/3 TR |
| 3,200,914 | 8/1965 | Downs et al. | 192/3 TR |
| 3,592,315 | 7/1971 | Lewis | 192/3 TR |
| 3,871,497 | 3/1975 | Bessiere | 192/3 TR |

*Primary Examiner*—Benjamin W. Wyche
*Attorney, Agent, or Firm*—George B. Oujevolk

[57] ABSTRACT

A brake mechanism comprises a cylinder body having a large chamber and a small chamber, a power piston movably positioned in the large chamber and dividing it into a control chamber and a vacuum chamber in communication with each other, a hydraulic piston and a control valve having a communication orifice both of which are positioned in said small chamber of the cylinder body and moved by a power piston to divide the small chamber into a high pressure chamber communicating with a driving wheel brake cylinder, a buffer chamber having a communication opening for selectively communicating the buffer chamber with a brake cylinder in accordance with the operation of the control valve and a control chamber, a relay valve cylinder communicating at one end with air and at the other end with the vacuum chamber and having a communication orifice open to the control chamber in the large chamber, a relay valve piston provided within a relay valve cylinder such that it can be operated by a movable core of an electromagnet for opening and closing the communication opening on the relay valve cylinder, a detecting means connected to the solenoid of the electromagnet through a servo amplifier to detect the locking of the driving wheels, and a communicating means for communicating the non-driving wheel brake cylinder with a master cylinder.

3 Claims, 6 Drawing Figures

ANTI-SKID BRAKE SYSTEM WITH ACCELERATOR CONTROL

This invention relates to a brake mechanism provided with anti-skid performance and, more particularly, to one which applies a braking force to undriven wheels in accordance with the engine braking effect on the driving wheels in the initial stage of the braking operation and releases braking force on driving wheels immediately before the driving wheels are locked. The pressure doubling apparatus in this brake mechanism has a control valve interlocked with a hydraulic piston and provides much interchangeability with respect to the prior-art pressure doubling apparatus, and it greatly reduces the braking distance as an overall effect.

The prior-art anti-skid brake system is complicated in construction and expensive due to the incorporation of a large number of special parts. Also, as in former brake systems, approximately 0.75 to 1 second is required from the moment braking operation is begun until the braking force begins to be applied. During this interval the vehicle continues travelling despite the will of the operator, and collisions are often the result. This is a problem which has not been solved.

Also when engine braking is applied to the driving wheels of a vehicle provided with a prior-art brake system, the vehicle body is decelerated due to braking of the driving wheels, and the rotational speed of the undriven wheels becomes equal to the rotational speed conforming to the vehicle speed. Thus, if the driving wheels do not slip on the road surface the rotational speed of the undriven wheels is equal to the rotational speed of the driving wheels and thus there is no difference in speed between them. Heretofore, however, the fact that driving wheels tend to lock at braking time, that the rear portion of the vehicle body swings laterally when breaking is suddenly applied and the fact that the vehicle body tends to turn sidewise when the brakes are applied at high speed are phenomena which have not yet been sufficiently explained. Furthermore, while it is a matter of common sense to brake firmly when carrying a heavy load of passengers or baggage or when travelling at high speed, the reason has not been explained theoretically. Moreover, while it is well known in other fields that the effect of vehicular inertia in the direction of travel is greater at higher speeds, heavier loads, and for more sudden stops, these factors are overlooked in the case of automobiles because they are so elementary. When the accelerator pedal is suddenly released in order to stop the vehicle, the vehicle tends to advance due to inertia since engine braking acts upon the driving wheels but not the undriven wheels where the entire load is applied. The driving wheels being braked are dragged by the vehicle resulting in skidding with respect to the road surface. Thus, although the apparent speeds of the front and rear wheels must be the same, a difference between them is produced. If the brake pedal is depressed at such time, the undriven wheels are in a state of reduced skid and are effectively braked, whereas the driving wheels tend to slip rather easily. Thus, the wheels only are braked independent of the vehicle speed so that the driving wheels tend to lock. This is apparent from the fact that, by interrupting braking with respect to the driving wheels, rotation of the wheels is restored due to their friction with the road surface, and locking is thus avoided.

Regarding the swinging of the rear portion of the vehicle body during sudden braking and sidewise turning of the vehicle body when the vehicle is suddenly braked at a high speed a phenomenon is known in which a vehicle travelling on ice, skids in the direction of travel if all the wheels are braked equally, tends to turn over if only the front wheels skid, and sidewise like a water wheel if only the rear wheels skid. Similar phenomena are sometimes caused by rain, snow, gravel, stones and other slippery materials. Thus, skidding of the rear wheels leads to swinging of the rear portion of the vehicle body and sidewise turning thereof, while skidding of the front wheels leads to steering in the wrong direction and over-turning of the vehicle. Regarding this point, the following was published in "The Magazine of Automotive Techniques".

1. When the front wheels are first locked, it is impossible to maintain steering. However, if the rear wheels do not lock, stability in the sidewise direction is maintained, permitting the vehicle to proceed in a straight line before stopping.

2. When the rear wheels are first locked, the sidewise frictional force of the rear wheels with respect to the road surface is practically reduced to zero, and this state is very dangerous because the slightest inbalance results in so-called "swing". Since the front wheels are not locked in this case, swing speed is pronounced resulting in control difficulties although steering is possible.

3. When both front and rear wheels are simultaneously locked, steering is possible immediately before locking and the vehicle proceeds in a straight line and stops without swinging even after all wheels are locked. From the standpoint of stability, the best case is when the front and rear wheels are simultaneously locked. When either front or rear wheels are locked first, locking of the front wheels is safer compared to locking of the rear wheels since vehicle movement is more readily forcastible in the former case.

In any case, it is assumed that (1) the braking forces on the left and right wheels are always equal and (2) the coefficient of friction between tire and road surface is the same for all wheels. Automobile manufacturers have developed, for the first time, a method of cutting brake oil pressure before locking as means for preventing locking of the front wheels of front wheel drive vehicles, later as means for preventing locking of the rear wheels of rear wheel drive vehicles. These means are provided so that the adverse effects of engine braking upon the driving wheels can be avoided. On the other hand, in the afore-mentioned "Magazine of Automotive Techniques" it is assumed that the coefficient of friction between tire and road surface is always equal for all wheels. This means that the problem relating to the difference in rotation between the front and rear wheels is avoided.

The present invention is accomplished under the recognition that the front wheels are always subject to rotational difference due to variations in the vehicle speed and braking, and thus further advances automotive concepts.

The primary object of the invention is to provide a brake mechanism, capable of braking undriven wheels according to the engine braking effect on the driving wheels to thereby minimize the difference in rotation between the front and rear wheels and thus prevent skidding of the front and rear wheels so as to obtain improved steering stability.

Another object of the invention f) provide a brake mechanism which permits the magnitude of the braking force to be controlled when applying braking to the d) in view of the fact that the engine braking effect varies greatly depending upon vehicle speed and the g); accelerator pedal operation, while subsequently interrupting the braking force on the undriven wheels and effecting braking by depressing the brake pedal, whereby the undriven wheels can be braked in stages in advance of the braking operation of the prior art to reduce the braking distance.

A further object of the invention is to provide a brake mechanism, which permits a warning lamp to be turned on at the instant the accelerator pedal is released and prior to the illumination of the brake which is illuminated by depressing the brake pedal to thus quickly convey the intention to brake.

These and other objects, features and advantages of the invention will become more apparent from the following description and claims and annexed drawings.

Figure 1:
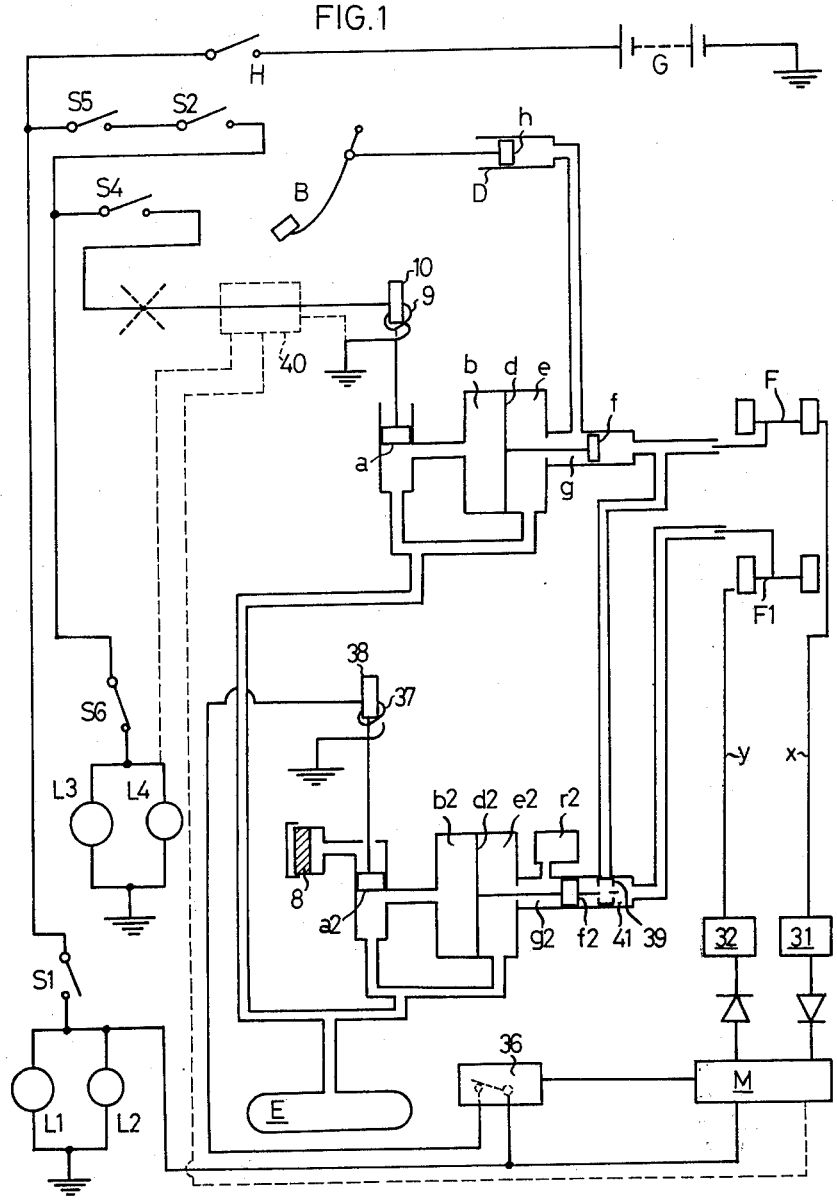
FIG. 1 shows the brake system including an electrical diagram and a sectional view, in which the invention as a whole is depicted.

An embodiment of the invention will now be described with reference to FIG. 1. Designated at B is a brake pedal, at D a master cylinder operated by the brake pedal, at E an intake manifold of the engine, at G an electrical power supply provided in the vehicle, and at H an engine switch. Designated at $S_1$ is a brake switch rendered operative by depressing the brake pedal B and inoperative by releasing the pedal. Designated at $L_1$ and $L_2$ are brake lamps, the former mounted on a rear portion of the vehicle and the latter mounted on a dashboard, and which lamps are in series with the power supply G. The equipment described so far belongs to the prior art.

Designated at 36 is a release amplifier. Roughly, it acts as a switch as indicated by a dashed line and is normally closed and open with a signal from a servo amplifier M. By closing the engine switch H and also closing a brake switch by depressing the brake pedal B current is caused to flow through a solenoid coil 37, whereby a movable core 38 is attracted in the downward direction in the Figure against a return spring. The movable core 38 is restored to the initial position with closure of the brake switch $S_1$ caused by releasing the brake pedal B. The movable core can also be restored or displaced in accordance with a signal from the servo amplifier M.

Designated at $S_5$ is a change-over switch opened by applying the hand brake and closed by releasing the brake, at $S_4$ is a release switch closed by depressing the clutch pedal and opened by releasing the pedal, and at $S_6$ is an warning switch opened depressing the brake pedal and closed by releasing the pedal. Designated at $L_3$ and $L_4$ are warning lamps in series with the warning switch $S_6$, the former mounted on a rear portion of the vehicle and the latter mounted on the dashboard, both serving to notify that the brakes are to be applied. Designated at $S_2$ is a detection switch adapted to be closed a predetermined period after suddenly returning or releasing the accelerator pedal, and it may be a switch provided near the steering wheel, a mat switch at the normal position of the foot when depressing the brake pedal, a switch for detecting other braking intentions, a switch for predicting danger or a combination of such switches.

Illustrated in an upper central portion of the Figure is a brake force doubling means. Designated at $a$ is a relay valve piston, at $b$ a control chamber, at $d$ power piston movably positioned in the large chamber, at $e$ a vacuum chamber, at $f$ a hydraulic piston coupled to the power piston, at $g$ an oil pressure control chamber and at $h$ a push rod reciprocable within the master cylinder and having one end connected to the brake pedal B. Normally, the relay valve piston $a$ occupies a position shown in the Figure and communicates the control chamber $b$ and vacuum chamber $e$ with each other, with negative pressure of the intake manifold E led to these chambers. In this state, the power piston $d$ and hydraulic piston $f$ are held at an equilibrium position, and undriven wheel brake means F connected to a high pressure chamber at the end of the small chamber (hereinafter referred to as undriven brake) is held inoperative. Designated at 9 is a solenoid coil, and at 10 a movable core. By causing a current to flow through the solenoid coil 9 or controlling the current the relay valve piston $a$ can be moved in the downward direction in the Figure to terminate communication between the control chamber $b$ and vacuum chamber $e$, thus permitting the piston $d$ to be moved in the rightward direction in the Figure. This means that by so doing the undriven brake can be operated as in the case of depressing the brake pedal B.

Figure 3:
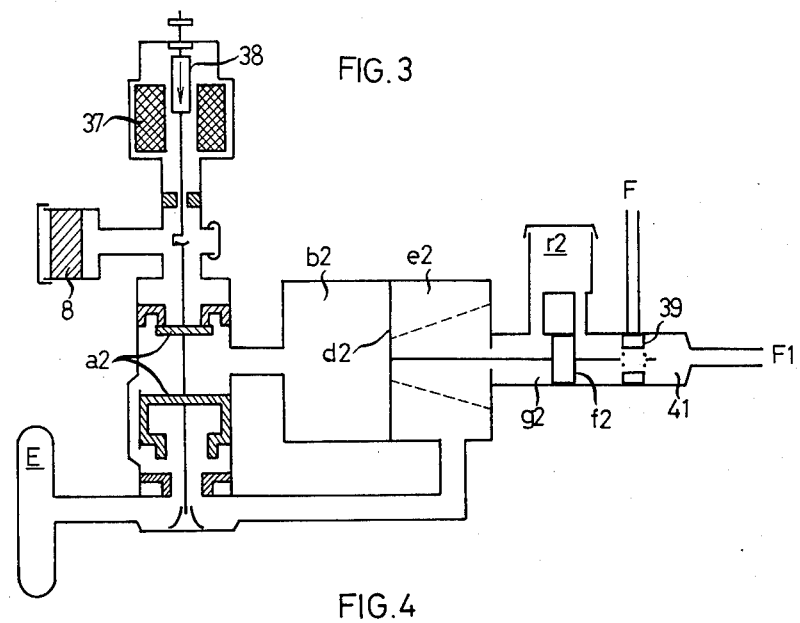
FIG. 3 is a sectional view of the brake mechanism.

Designated at $F_1$ is driving wheel brake means (hereinafter referred to as drive brake). Illustrated in a central lower portion of the Figure and also in FIG. 3 is a brake force doubling means provided with control valve means. Designated at $r_2$ is a reserve tank, and at $a_2$ to $g_2$ parts corresponding to the respective parts $a$ to $g$. Designated at 39 is a control valve coupled to the hydraulic piston $f_2$. Normally, it occupies the illustrated position and is blocking communication between the drive brake $F_1$ and non-drive brake F and has an axial communication hole. When the brake switch $S_1$ is closed by depressing the brake pedal B, current flows through the solenoid coil 37, thus downwardly pulling the relay valve piston $a_2$ and terminating communication between the control chamber $b_2$ and vacuum chamber $e_2$. As a result, a air enters through a cleaner element 8 into the control chamber $b_2$ to push the power piston $d_2$, thus pushing the hydraulic piston $f_2$ and control valve 39, whereby the undriven brake F and drive brake $F_1$ are communicated with each other. In this way, it is possible to operate the undriven brake F and drive brake $F_1$ with the same force according to the extent of depression of the brake pedal.

The hydraulic piston $f$ is substantially restored immediately after releasing the brake pedal B to release the brake force on the brake $F_1$ brake F, while on the other hand the brake switch $S_1$ is actuated. This means that there is a time lag of about 0.1 second, that is, current through the solenoid coil 37 is cut about 0.1 second after the restoration of the hydraulic piston $f$. With cutting of the current the relay valve piston $a_2$ is restored to the illustrated position, thus restoring the control valve 39 to the illustrated position to terminate communication between the drive brake $F_1$ and non-drive brake F again.

Designated at 31 and 32 are preamplifiers connected to the input side of the servo amplifier M. An output $x$ of an undriven wheel rotation sensor provided on the rotative part of the undriven wheel system (hereinafter referred to as undriven sensor output) is coupled to the input of the preamplifier 31, while an output $y$ of a driving wheel system provided on the rotative part of the driving wheel system (hereinafter referred to as drive sensor output) is coupled to the input of the preamplifier 32. The undriven sensor output $x$ is coupled as a positive wave and the drive sensor output $y$ as a negative wave so as to use the output of the servo amplifier M to obtain a signal for the locking of the driving wheels or to controlling the release amplifier 36.

Figure 4:
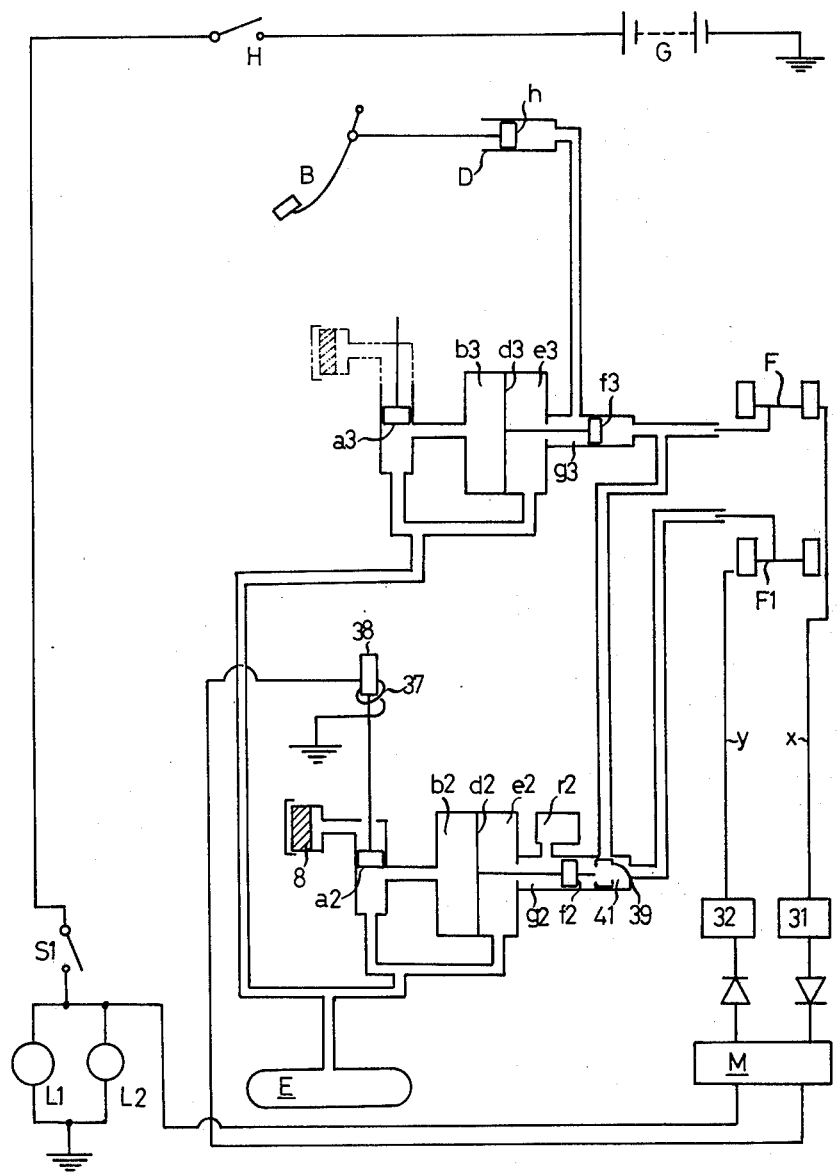
FIGS. 4 to 6 show other examples of electrical diagrams showing of the brake mechanism.
Figure 5:
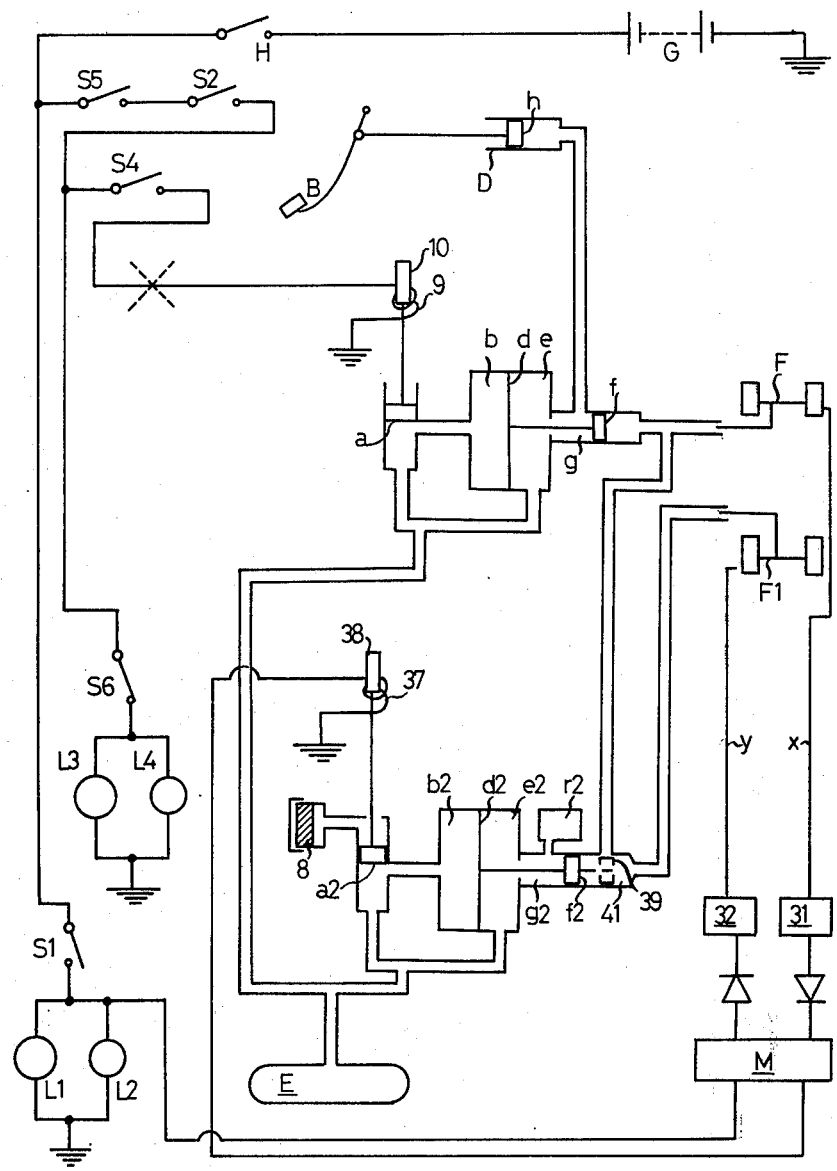
Figure 6:
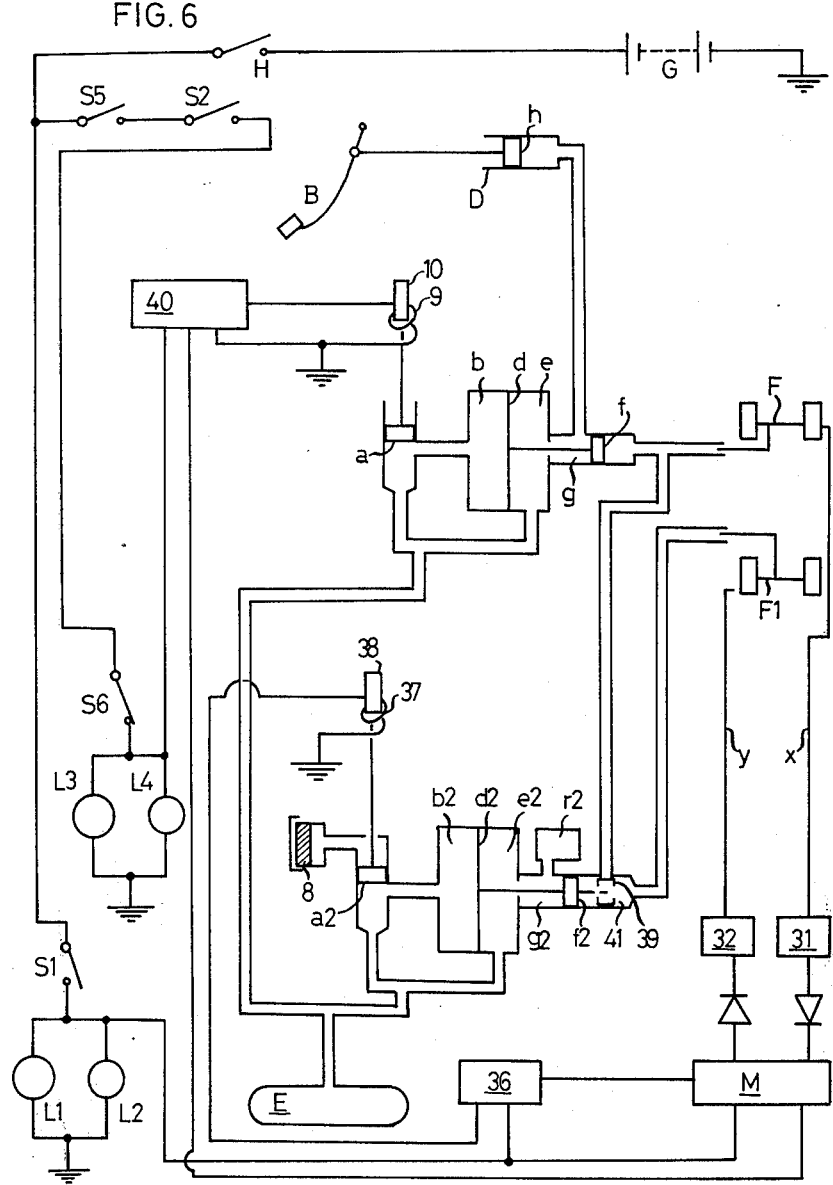

Now, other forms of the invention will be described in comparison with FIG. 1. FIG. 4 shows an example, in which the circuit pertaining to the warning lamp $L_3$ that pertaining to the solenoid coil 9 and movable core 10, release amplifier 36 and control amplifier 40 in the system of FIG. 1, are omitted. FIG. 5 shows another example, in which the control amplifier 40 and release amplifier 36 in FIG. 1 are omitted. FIG. 6 shows a still another example, in which the release switch $S_4$ and related circuit are omitted.

These examples will now be described omitting what has been described in connection with FIG. 1.

Referring now to FIG. 4, shown at a central upper portion of the Figure is a brake force doubling means of a well known construction, with parts $a_3$ to $g_3$ corresponding to the respective parts $a$ to $g$ described above. This construction is the same as that shown in FIG. 1 except for the absence of the solenoid portion, and its parts are interchangeable with those in the FIG. 1 construction. By depressing brake pedal B brake switch $S_1$ is closed to turn on brake lamp $L_1$ and so forth and also cause current to pass through servo amplifier M, preamplifers 31 and 32 and solenoid coil 37. As a result, movable core 38 is downwardly pulled to push hydraulic piston $f_2$ and control valve 39 in the rightward direction in the Figure, so that undriven brake F and drive brake $F_1$ are communicated with each other. By this time, push rod $h$ is displaced according to the pushing force on the brake pedal, with hydraulic piston $f_3$ pushed in the rightward direction in the Figure. Thus, brake force according to the depressing force is applied to both the undriven brake F and drive brake $F_1$, and this state continues until the vehicle comes to a halt. When the driving wheels are about to lock, the drive sensor output $y$ suddenly changes, so that the servo amplifier M cuts current through the solenoid coil 37 to restore the power piston $d_2$, hydraulic piston $f_2$ and control valve 39 to the illustrated positions, whereby the communication between the undriven brake F and drive brake $F_1$ is cut. As a result, the volume of high pressure chamber 41 is suddenly increased to interrupt the braking force on the drive brake $F_1$. With resultant restoration of rotation of the driving wheels to avoid locking, the drive sensor output $y$ restored to cause a current to again flow through the solenoid coil 37. In this way, the braking state before the driving wheels are about to lock can be sustained.

The brake force doubling means consisting of parts $a_2$ to $g_2$ provides much interchangeability in its parts with respect to the prior-art consisting of the parts $a_3$ to $g_3$, and this leads to cost reduction when replacing the prior-art means which includes an actuator. Further, general purpose integrated circuits can be used for the individual preamplifiers and servo amplifier, and such construction is comparable in overall effect with expensive prior-art means and can be readily mounted in most automobiles.

Furthermore, it is possible to omit the sensor and preamplifier 31 by providing an integrated circuit, having a long time constant, between the preamplifier 32 and servo amplifier M to realize a sharp change of drive sensor output $y$ on the output side of the servo amplifier M. Moreover, in lieu of the brake force doubling means consisting of the parts $a_3$ to $g_3$, the output side of the master cylinder D can be directly connected to the undriven brake; by so doing the anti-skid performance itself is not adversely effected.

Referring now to FIG. 5, when engine switch H, changeover switch $S_5$, release switch $S_4$ and alarm switch $S_6$ are closed while the vehicle is travelling, and when the accelerator pedal is suddenly released, detection switch $S_2$ is closed to cause a current to flow through solenoid coil 9 so as to move movable core 10 and relay valve $a$ in the downward direction in the Figure, whereby undriven brake F is operated. When the brake pedal B is depressed, the brake switch $S_1$ is closed to turn on brake lamp $L_1$ and cause current to flow through solenoid coil 37. As a result, movable core 38 and relay valve piston $a_2$ move in the downward direction in the Figure to push hydraulic piston $f_2$ and control valve 39 in the rightward direction in the Figure, so that undriven brake F and drive brake $F_1$ are communicated with each other. In this way, braking force according to the depressing force on the brake pedal is applied to drive brake $F_1$ and undriven brake F with the displacement of push rod $h$. When the driving wheels are about to be locked, drive sensor output $y$ suddenly changes to cut the current through solenoid coil 37. Thus, the braking force on drive brake $F_1$ is interrupted to permit locking to be avoided in the manner as mentioned earlier. After a subsequent short period the rotation of drive wheel is restored in the manner as described above, and this state is continued until the vehicle stops.

When the decision to stop is made and the stopping operation is about to begin, braking is applied to the undriven wheels in accordance with the engine braking effect until the brake pedal 8 is depressed, thus braking in effect all the wheels. Subsequently, braking of the undriven wheels is interrupted and thereafter all the wheels are braked by the depressing force on the brake pedal.

When driving on steep grades, it is sometimes convenient if a thermoswitch or the like is connected at a position indicated by the cross hatched section so that current is cut after several seconds.

In an application of this example, the warning lamps $L_3$ and $L_4$ and warning switch $S_6$ are added, with the remaining components unchanged. Upon closing the warning switch 6 or suddenly releasing the accelerator pedal while the vehicle is travelling, the warning switch $S_2$ is closed to turn on the warning lamps $L_3$ and $L_4$, and by depressing the brake pedal B the warning switch $S_6$ is opened to close the brake switch $S_1$, thus extinguishing the warning lamps $L_3$ and $L_4$ while turning on the brake lamp $L_2$. The other operations and effects are the same as described above.

Formerly, only the brake lamp $L_1$ was available as means for notifying other drivers of the invention to brake, with a time lag of 0.75 to 1 second involved from the decision of the intention to brake till the notification thereof. According to this invention, the intention to brake can be signaled within 0.1 to 0.2 seconds of the decision by the warning lamp $L_3$ which illuminates in advance of the brake lamp $L_1$. As a result, the intention to brake can be forcasted and collisions reduced.

Figure 2:
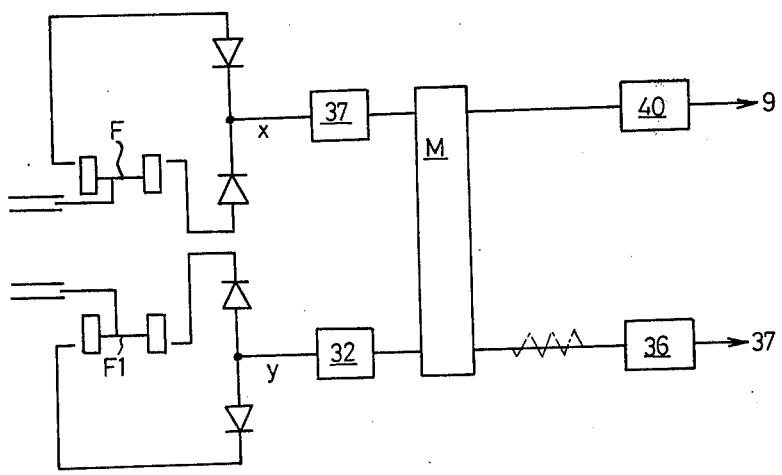
FIG. 2 is a connection diagram of an example of the brake mechanism.

Referring now to FIG. 6, shown at 40 in the Figure is a control amplifier. It is connected to a power supply upon closure of detection switch $S_2$ and is disconnected from the power supply upon opening of the detection switch $S_2$ concurrently with the opening of the alarm switch $S_6$ by depressing the brake pedal B. Regarding the servo amplifier M, while its usual output is nearly zero with positive and negative input voltages substantially cancelling each other, reduction of the drive sensor output voltage $y$ due to such cause as engine braking on the driving wheels produces an output corresponding to the difference which accordingly brakes the undriven wheels by causing a current to flow through the solenoid coil 9 only when the control amplifier 40 carries current. In other words, the output of the servo amplifier should approach zero. By depressing the brake pedal B the brake switch $S_1$ is closed to render release amplifier 36 operative, causing a current to flow in solenoid coil 37 to push the control valve 39 in the rightward direction in the Figure, whereby drive brake $F_1$ and undriven brake F are communicated with each other to permit braking in accordance with the depressing force on the brake pedal. When the driving wheels are about to lock, the drive sensor output $y$ is suddenly reduced to cause an excess positive wave to be delivered from the servo amplifier M and coupled to release amplifier 36. Thus, current through solenoid coil 37 is cut to restore control valve 39 to the illustrated position and terminate the communication between drive brake $F_1$ and undriven brake F. As a result, the volume of high pressure chamber 41 is suddenly increased to reduce the pressure therein, thereby releasing the braking force on drive brake $F_1$. After locking is avoided in this way the rotation of the driving wheels is soon restored, and this state is continued until the vehicle stops. FIG. 2 is a modification, in which sensor outputs are obtained from the opposite side wheels. In this way, the performance of the servo amplifier M can be improved.

While the foregoing embodiments are concerned with oil brakes, in accordance with the invention it is possible to use air brakes which are operated by oil pressure. Further, the invention can also be applied to movable objects other than automobiles.

I claim as my invention:

1. A brake mechanism with a first and second unit, said first unit comprising:
   a. a first cylinder body having a first large chamber and a first small chamber;
   b. a first power position ($d2$) movably positioned in said first large chamber of the first cylinder body for dividing the first large chamber into a first control chamber ($b2$) and a first vacuum chamber ($e2$);
   c. said first vacuum chamber ($e2$) in the first large chamber communicating with an intake manifold (E);
   d. a first hydraulic piston ($f2$) and a control valve (39) having a communicating orifice positioned in said first small chamber of the first cylinder body to be moved by said power piston ($d2$) to divide the first small chamber into a first high pressure chamber (41), a buffer chamber and a second control chamber ($g2$);
   e. said high pressure chamber (41) in the small chamber communicating with a brake cylinder ($F_1$) of a driving wheel;
   f. said buffer chamber in the first small chamber having a communicating opening for selectively communicating the buffer chamber with a brake cylinder (F) of an undriven wheel in accordance with the operation of said control valve (39);
   g. a first relay valve cylinder communicating at the one end with air and at the other end with said first vacuum chamber ($e2$) having a communicating opening with said first control chamber ($b2$) in the first large chamber;
   h. a first relay valve piston ($a2$) positioned in said first relay valve cylinder to be moved by a first plunger (38) of a first electromagnet for opening and closing said communicating opening on the first relay valve cylinder;
   i. detecting means connected with a solenoid (37) of said first electromagnet through a servoamplifier (M) for detecting the lock phenomenon of the driving wheel; said second unit comprising power magnifying connecting means for connecting said brake cylinder (F) of the undriven wheel to a master cylinder (D), including:
   j. a second cylinder body having a second large chamber and a second small chamber;
   k. a second power piston ($d$) movably positoned in said second large chamber of the second cylinder body to divide the second large chamber into a third control chamber ($b$) and a second vacuum chamber ($e$);
   l. said second vacuum chamber ($e$) in the large chamber communicating with the intake manifold (E):
   m. a second hydraulic piston ($f$) positioned in said second small chamber of the second cylinder body to be moved by said second power piston ($d$) to divide the second small chamber into a second high pressure chamber and a fourth control chamber ($g$);
   n. said second high pressure chamber in the second small chamber communicating with the brake cylinder (F) of the undriven wheel;
   o. said fourth control chamber ($g$) in the second small chamber communicating with the master cylinder (D);
   p. a second relay valve cylinder communicated at the one end with air and at the other end with said second vacuum chamber ($e$) having a communicating opening with said third control chamber ($b$) in the second large chamber; and
   q. a second relay valve piston ($a$) positioned in said second relay cylinder to be moved by a second plunger (10) of a second electromagnet for opening and closing said communicating opening on the second relay valve cylinder, a solenoid (9) of said second electromagnet connecting with an electric source (G) through a switch (S2) which is closed by the quick release operation of an accelerator pedal.

2. A brake mechanism as claimed in claim 1 further comprising a warning lamp(L3) connected with said switch(S2) throught a normally closed warning switch(S6) which is opened by depressing the brake pedal, (B) in parallel with the solenoid(9) of the second mentioned electromagnet, whereby said warning lamp(L3) is illuminated by the quick release operation of rhe accelerator pedal prior to braking.

3. A brake mechanism as claimed in claim 1 further comprising
  a warning lamp(L3) connected with said switch(S2) through a normally closed warning switch(S6) which is opened by depressing the brake pedal(B) in parallel with the solenoid(9) of the second mentioned electromagnet, whereby said warning lamp(L3) is illuminated by the quick release operation of the accelerator pedal prior to braking,
  a control amplifier(40) connected with the electric source(G) in parallel with said warning lamp(L3),
  said control amplifier(40) connecting with the solenoid(9) of the second mentioned electromagnet and the servoamplifier(M),
  a release amplifier(36) connected with the electric source(G) in parallel with a brake lamp(L1),
  said release amplifier (36) connected with the solenoid(37) of the first mentioned electromagnet and the servoamplifier(M), and
  sensing means connected with the input side of the servoamplifier(M) for sensing the rotation of the driving wheel and undriven wheel, whereby said solenoid(37) of the first mentioned electromagnet is powered by the release amplifier(36) when an excessive output signal is delivered from the servoamplifier(M) to the release amplifier(36).

* * * * *